(12) United States Patent
Rezvani et al.

(10) Patent No.: US 7,075,998 B1
(45) Date of Patent: Jul. 11, 2006

(54) METHOD AND APPARATUS FOR SYMMETRICAL DMT X-DSL COMMUNICATIONS

(75) Inventors: Behrooz Rezvani, Pleasanton, CA (US); Sam Heidari, Fremont, CA (US); Dale Smith, Fremont, CA (US); Reuven Segev, San Rafael, CA (US)

(73) Assignee: Ikanos Communications Inc., Fremont, CA (US)

( * ) Notice: Subject to any disclaimer, the term of this patent is extended or adjusted under 35 U.S.C. 154(b) by 669 days.

(21) Appl. No.: 09/779,788

(22) Filed: Feb. 7, 2001

Related U.S. Application Data

(63) Continuation of application No. 09/757,018, filed on Jan. 8, 2001, now abandoned.

(60) Provisional application No. 60/175,048, filed on Jan. 7, 2000.

(51) Int. Cl.
*H04L 27/28* (2006.01)
(52) U.S. Cl. .................................................. 375/260
(58) Field of Classification Search ................ 375/130, 375/140, 141, 219, 222, 220, 260; 370/203, 370/208, 209, 335, 342, 441
See application file for complete search history.

(56) References Cited

U.S. PATENT DOCUMENTS

| 6,628,722 B1 * | 9/2003 | Laroia et al. | 375/259 |
| 6,747,992 B1 * | 6/2004 | Matsumoto | 370/468 |
| 6,795,426 B1 * | 9/2004 | Raleigh et al. | 370/345 |

* cited by examiner

*Primary Examiner*—Betsy L. Deppe
(74) *Attorney, Agent, or Firm*—IP Creators; Charles C Cary

(57) ABSTRACT

A method and apparatus for communicating multi-tone modulated upstream and downstream channels of communication data between a pair of communication devices utilizing a common set of tones for the upstream and downstream channels. The pair of communication devices each include a digital stage configured to assign mutually orthogonal code sequences for encoding and decoding the upstream and downstream channel respectively. The transmit path of the digital stage of each communication device is configured to generate redundancy in the associated communication data in either the time or frequency domain and to encode the redundant communication data with the mutually orthogonal code sequence prior to transmission thereby allowing the communication devices to share a common frequency spectrum of a communication medium for the upstream and downstream communication channels.

6 Claims, 9 Drawing Sheets

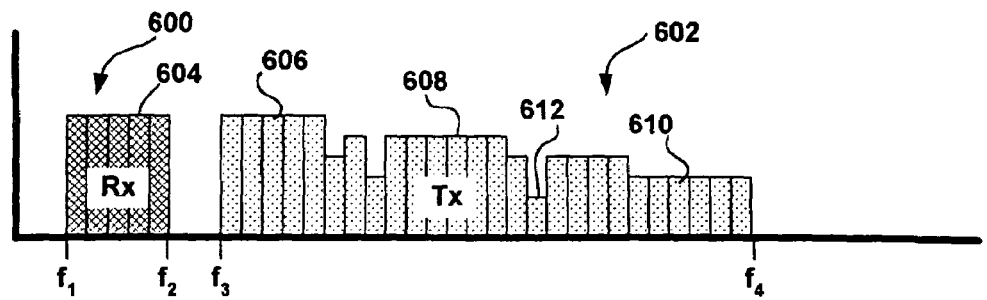
FIG. 6A    Prior Art
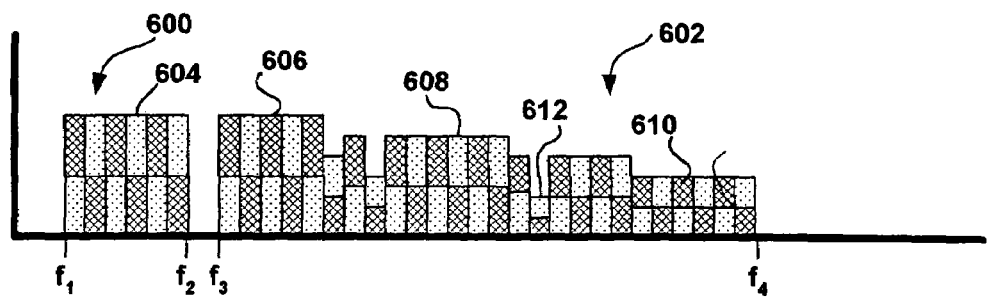
FIG. 6B    CDMA_F
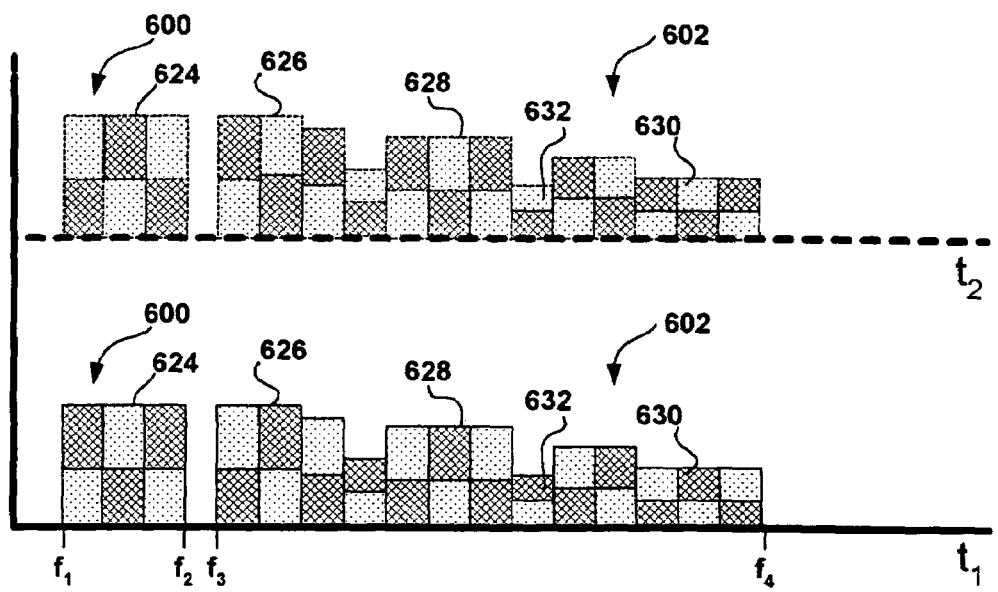
FIG. 6C    CDMA_T

METHOD AND APPARATUS FOR SYMMETRICAL DMT X-DSL COMMUNICATIONS

CROSS REFERENCE TO RELATED APPLICATION

This application is a continuation of U.S. application Ser. No. 09/757,018 filed Jan. 8, 2001 now abandoned entitled "Method and Apparatus for Symmetrical DMT X-DSL Communications" which claims the benefit of prior filed Provisional Applications No. 60/175,048 filed on Jan. 7, 2000 entitled "FULL SPECTRUM X-DSL TRANSMISSION". Each of the above-cited applications is incorporated herein by reference in its entirety.

BACKGROUND OF THE INVENTION

1. Field of Invention

This invention relates generally to X-DSL communications, and more particularly, X-DSL communications employing a DMT line code.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, SDSL, MDSL, RADSL, HDSL, etc. all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation.

X-DSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop. Modems essentially have three hardware sections: (a) an analog front end (AFE) to convert the analog signals on the subscriber line into digital signals and convert digital signals for transmission on the subscriber line into analog signals, (b) digital signal processing (DSP) circuitry to convert the digital signals into an information bit stream and optionally provide error correction, echo cancellation, and line equalization, and (c) a host interface between the information bit stream and its source/destination. Typically all of these components are located on a highly integrated single line card with a dedicated connection between one or more AFE's and a DSP.

Within each X-DSL protocol there are at least two possible line codes, or modulation protocols; i.e. discrete multi-tone (DMT) and carrierless AM/PM (CAP). The first of these line codes, i.e. DMT, requires the DSP to implement both an inverse fast Fourier transform (IFFT) on upstream data received from the subscriber and a fast Fourier transform (FFT) on the downstream data transmitted to the subscriber. Typically the DSP is available as a discrete semiconductor chip which implements the transforms for a dedicated one of the X-DSL standards using software routines running on an internal processor.

Each X-DSL installation represents a sizeable expense in hardware and service labor to provision the central office. The expense may not always be amortized over a sufficient period of time due the relentless introduction of new and faster X-DSL standards each of which pushes the performance boundaries of the subscriber line in the direction of increasing bandwidth and signal integrity. As each new standard involves, line cards must typically be replaced to upgrade the service.

When X-DSL was first implemented the typical user profile was that of a home or business user making intermittent access to the Internet over a subscriber line. Since the communication was extremely asymmetrical as to bandwidth requirement many of the popular X-DSL protocols provided significantly greater bandwidth from the central office to the subscriber than in the opposite direction. User profiles are changing as more and more users business and individual are becoming significant content providers or distributors as well as users.

What is needed are communication techniques which provide options for users who require higher upstream bandwidth.

SUMMARY OF THE INVENTION

The current invention provides a method and apparatus for communicating two or more channels of DMT modulated data within the same frequency spectrum, thus providing symmetrical bandwidth for upstream and downstream communication across a communication medium. The apparatus may be used for dual channel or multi-channel communications. The method may be implemented on a physical modem or a logical modem with the logical modem including a digital signal processor (DSP) coupled to an analog front end (AFE). The communication medium may include: wired, wireless and optical. Orthogonality in either the time or frequency domains is injected into the individual symbols associated with each DMT tone set or between successive tone sets using a unique code, e.g. Walsh code, assigned to each transmitted channel. The mutual orthogonality of these codes allows two or more channels to be supported in either an upstream or downstream direction using a DMT line code, in connection with any of the various X-DSL protocols including: G.Lite, ADSL, VDSL, SDSL, MDSL, RADSL, HDSL, etc.

In an embodiment of the invention a communication device for coupling to a communication medium and communicating at least two channels of data modulated with DMT line code using a common set of tones for both a transmit path and a receive path is disclosed. The communication device includes an analog stage and a digital stage. The analog stage converts on the transmit path digitized DMT symbols in the time domain to analog signals. The analog stage also converts on the receive path analog signals into the digitized DMT symbols in the time domain. The digital stage generates a selected one of time domain redundancy and frequency domain redundancy within the DMT line code for both the transmit path and the receive path to obtain symmetrical bandwidth on the transmit path and the receive path.

In an alternate embodiment of the invention a method for communicating at least two channels of data between at least two modems is disclosed. Each modem includes a transmit path and a receive path and each of the at least two modems implement DMT modulation and demodulation on the transmit path and the receive path respectively. The method for communicating comprises the acts of:

implementing a common set of sub carriers for communications of the at least two channels of data between the modems and each sub carrier within the common set of sub carriers correlating with a respective tone within a common set of DMT tones;

generating one of time domain redundancy and frequency domain redundancy among the DMT tones transmitted and received by each of said modems to obtain symmetrical bandwidth for communications between said at least two modems across the common set of sub carriers.

BRIEF DESCRIPTION OF THE DRAWINGS

These and other features and advantages of the present invention will become more apparent to those skilled in the art from the following detailed description in conjunction with the appended drawings in which:

FIG. 6A is a graph of a prior art asymmetrical DMT line code showing both the upstream and downstream frequency ranges with representative tones.

FIG. 6BC are graphs of the line code in which multiple access is accomplished via redundancy in the frequency domain and the time domain respectively, to enable symmetrical use of the frequency ranges shown in FIG. 6A.

DETAILED DESCRIPTION OF THE EMBODIMENTS

The current invention provides a method and apparatus for communicating two or more channels of DMT modulated data within the same frequency spectrum, thus providing symmetrical bandwidth for upstream and downstream communication across a communication medium. The apparatus may be used for dual channel or multi-channel communications. The method may be implemented on a physical modem or a logical modem with the logical modem including a digital signal processor (DSP) coupled to an analog front end (AFE). The communication medium may include: wired, wireless and optical. Orthogonality in either the time or frequency domains is injected into the individual symbols associated with each DMT tone set or between successive tone sets using a unique code, e.g. Walsh code, assigned to each transmitted channel. The mutual orthogonality of these codes allows two or more channels to be supported in either an upstream or downstream direction using a DMT line code, in connection with any of the various X-DSL protocols including: G.Lite, ADSL, VDSL, SDSL, MDSL, RADSL, HDSL, etc. The present invention provides a signal processing architecture that supports scalability of central office (CO) or, Digital Loop Carrier (DLC) or, Optical Network Units (ONU) resources, and allows a significantly more flexible hardware response to the evolving X-DSL standards without over committing of hardware resources. As standards evolve hardware may be reconfigured to support the new standards.

Figure 1:
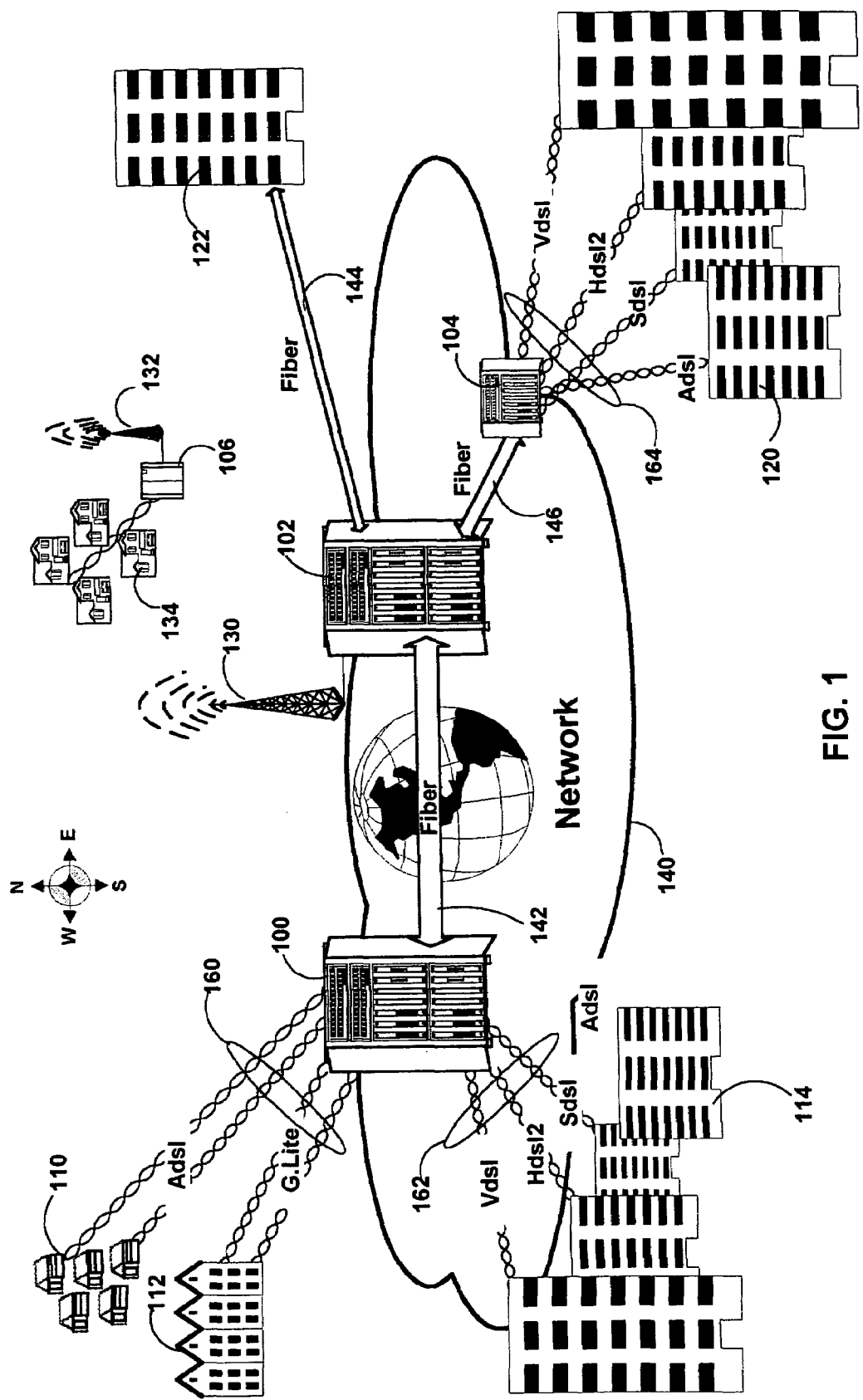
FIG. 1 depicts an overall system environment in which individual subscribers are coupled across public service telephone network (PSTN) subscriber lines with one or more high speed networks.

FIG. 1 depicts an overall system environment in which individual subscribers are coupled across public service telephone network (PSTN) subscriber lines with one or more high speed networks. Telco COs 100, 102, 106 and remote access terminal 104 are shown coupling various subscribers to one another and to a high speed network 140. The high speed network 140 provides fiber optic links between the central office and remote access terminal. CO's 100–102 are coupled to one another via fiber optic link 142. CO 102 couples to remote access terminal 104 via fiber optic link 146. CO also couples to subscriber site 122 via fiber optic link 144. CO 102 and CO 106 couple to one another via a wireless link provided by corresponding wireless transceivers 130 and 132 respectively. The "last mile" connecting each subscriber, (except subscriber 122) is provided by twisted copper PSTN telephone lines. On these subscriber lines voice band and data communication are provided. The data communication is shown as various X-DSL protocols including G.Lite, ADSL VDSL, and HDSL2. CO 100 is coupled via G.Lite and ADSL modulated subscriber line binder 160 with subscribers 110 and 112. CO 100 is also coupled via G.Lite and ADSL modulated subscriber line binder 162 with subscriber 114. CO 106 is also coupled via a subscriber line to subscriber 134. Remote access terminal is coupled via subscriber line binder 164 with subscribers 120. In each case the corresponding CO may advantageously be provided with distributed AFE and DSP resources for handling multiple protocols from multiple locations with the added benefit of load balancing, and statistical multiplexing. The apparatus and method of the current invention is suitable for handling communications on any of these subscriber lines. Communications are also provided between DSP resources at one site, e.g. CO 100 and AFE resources at a separate site, e.g. CO 102. This later capability allows distributed processing whereby all DSP resources can be placed in a logical server environment hence supporting a client server architecture.

Figure 2:
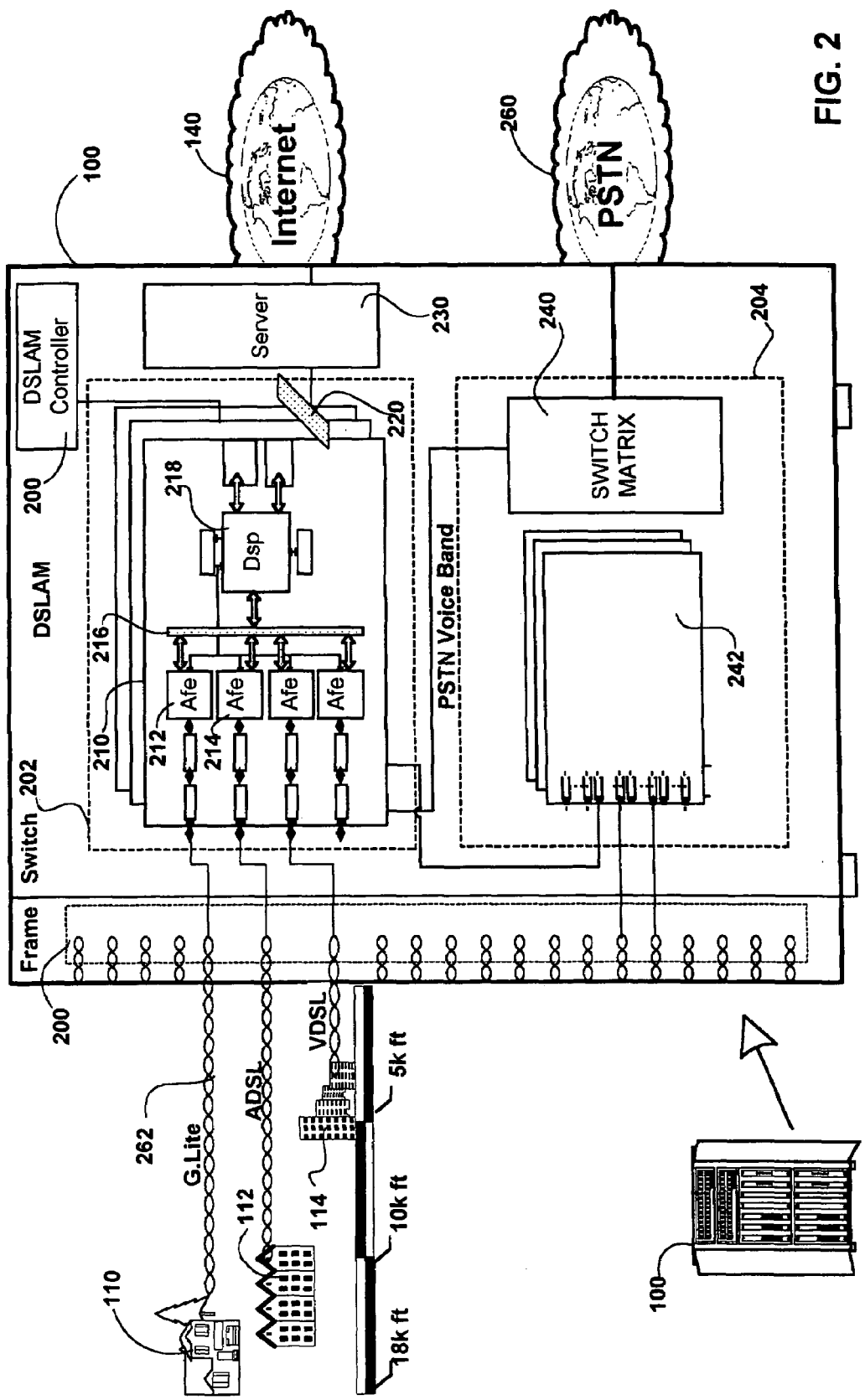
FIG. 2 depicts a more detailed view of a representative one of the central offices shown in FIG. 1 including both digital subscriber line access modules (DSLAMs) and PSTN voice band modules.

FIG. 2 depicts a more detailed view of a representative one of the central offices shown in FIG. 1 including both digital subscriber line access modules (DSLAMs) and PSTN voice band modules. The CO 100 includes subscriber line connections to subscribers 110–114. Subscriber line 262 couples subscriber 110 with the CO. Each of these connections terminates in the frame room 200 of the CO. From this room connections are made for each subscriber line via splitters and hybrids to both a DSLAM 202 and to the voice band racks 204. The splitter shunts voice band communications to dedicated line cards, e.g. line card 242 or to a voice band modem pool (not shown). The splitter shunts higher frequency X-DSL communications on the subscriber line to a selected line card 210 within DSLAM 202. The line cards of the current invention are universal, meaning they can handle any current or evolving standard of X-DSL and may be upgraded on the fly to handle new standards.

Voice band call set up is controlled by a Telco switch matrix 240 such as SS7. This makes point-to-point connections to other subscribers for voice band communications on the Public Switched Telephone Network (PSTN) 260. The X-DSL communications may be processed by a universal line card such as line card 212. That line card includes a plurality of AFE's e.g. 212–214 each capable of supporting a plurality of subscriber lines. The AFEs are coupled via a proprietary packet based bus 216 to a DSP 218 which is also capable of multi-protocol support for all subscriber lines to which the AFE's are coupled. The line card itself is coupled to a back-plane bus 220 which may in an embodiment of the invention be capable of offloading and transporting low latency X-DSL traffic between other DSPs for load balancing. Communications between AFE's and DSP(s) are packet based which allows a distributed architecture such as will be set forth in the following FIG. 3 to be implemented. Each of the DSLAM line cards operates under the control of a DSLAM controller 200 which handles global provisioning, e.g. allocation of subscriber lines to AFE and DSP resources. Once an X-DSL connection is established between the subscriber and a selected one of the DSLAM submodules, e.g. AFE and DSP the subscriber will be able to access any network to which the DSLAM is connected. In the example shown the DSLAM couples via server 230 with Internet 140.

Figure 3:
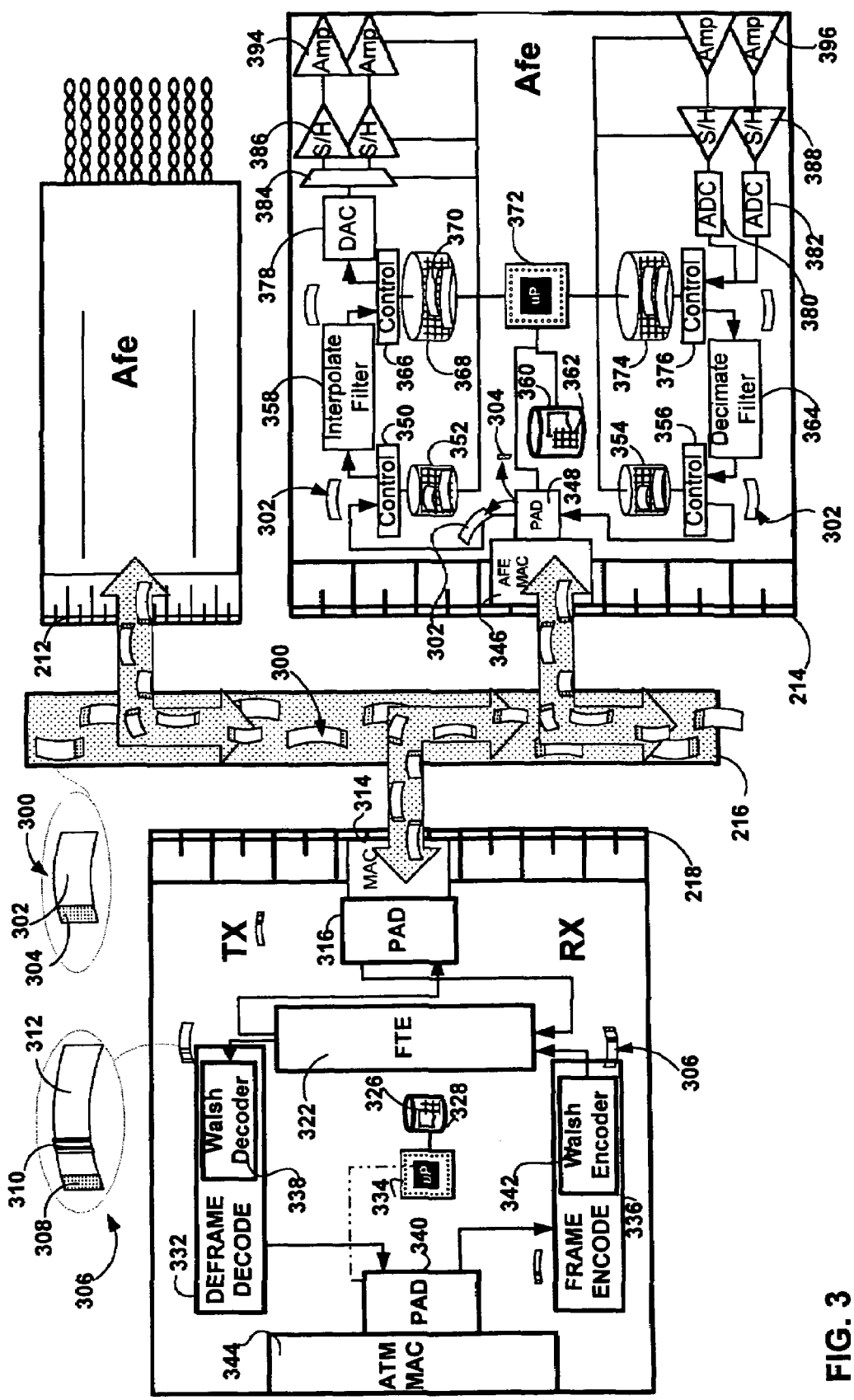
FIG. 3 is an expanded hardware view of one of the line cards in the central office shown in FIG. 2 which supports code division multiple access (CDMA) for discrete multi-tone "DMT" line codes.

FIG. 3 is a chip level view of an embodiment of the invention implemented within a logical modem formed on line card 210 by the DSP 218 and AFE 214. The AFE's chips 212–214 connect with a DSP chip 218 across bus 216. They all may be mounted on the line card 210 shown in FIG. 2. Packets of raw data are shown being transported between the DSP and AFEs as well as within each DSP and AFE. Packet processing between the DSP and AFE chips involves transfer of bus packets 300. Packet processing within a DSP may involve device packets 306 (See FIG. 5). Packet processing within an AFE may involve raw data packets 302. These will be discussed in the following text.

These modules, AFE and DSP, may be found on a single universal line card, such as line card 210 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

The DSP chip 218 includes an upstream receive path and a downstream transmit path with both discrete and shared components. Data for each of the channels is passed along either path in discrete packets the headers of which identify the corresponding channel and may additionally contain channel specific control instructions for various of the shared and discrete components along either the transmit or receive path.

On the upstream path, upstream packets from various of the subscribers are received by the DSP medium access control (MAC) 314 which handles packet transfers to and from the DSP bus. These packets contain digital data corresponding with DMT symbols expressed in the time domain. There is redundancy in one of the frequency or the time domain for the upstream DMT symbols. Where redundancy in the frequency domain is implemented a single set of DMT symbols contains redundancy of order R for the symbol set. Where redundancy is expressed in the time domain successive sets of DMT symbols contain redundancy of order R. This redundancy implemented with orthogonal coding between channels carried on the subscriber line allows multiple channels to be carried in either the upstream or downstream direction on the subscriber line 262. The MAC couples with a packet assembler/disassembler (PAD) 316. For upstream packets, the PAD handles removal of the DSP bus packet header and insertion of the device header and control header which is part of the device packet 306. The content of these headers is generated by the core processor 334 using information downloaded from the DSLAM controller 200 (See FIG. 2) as well as statistics such as gain tables gathered by the de-framer 332, or embedded operations channel communications from the subscriber side. These channel specific and control parameters 326 are stored in memory 328 which is coupled to the core processor. The PAD 316 embeds the required commands generated by the core processor in the header or control portions of the device packet header of the upstream data packets. The upstream packets may collectively include data from multiple channels each implementing various of the X-DSL protocols both with and without time and/or frequency domain redundancy depending on the subscriber line from which they originated.

The header of each device packet identifies the channel corresponding with the data contained therein. Additionally, a control portion of the packet may include specific control instructions for any of the discrete or shared components which make up the upstream or downstream processing paths. In the embodiment shown, the Fourier transform engine (FTE) 322 is a component which is shared between the upstream and downstream paths. Thus, on the upstream path each upstream packet is delivered to the FTE for demodulation. The FTE handles the mapping of data and the processing of the packets as it flows through the FTE. The information in the header of the packet is used to maintain the channel identity of the data as it is demodulated, to setup the FTE at the appropriate parameters for that channel, e.g. sample size, and to provide channel specific instructions for the demodulation of the data. The demodulated data is passed as a packet to the next component in the upstream path, e.g. the Walsh decoder. Where redundancy in one of the time and frequency domain exists in an incoming channel the Walsh decoder 338 removes that redundancy by combining the code for the transmitted channel with the received data to remove the redundancy. The various Walsh codes for each received channel which implements redundancy may be provided during session setup along with the Walsh codes for the transmission of each redundant channel. Next the digitized DMT symbols are decoded, reordered and deframed within the remainder of the deframer decoder 332. Each component in the receive path reads the next device packet and processes the data in it in accordance with the instructions or parameters in its header. The demodulated, decoded and de-framed data is passed to the asynchronous transfer mode (ATM) PAD 340. In the ATM PAD the device packet header is removed and the demodulated data contained therein is wrapped with an ATM header. The packet is then passed to the ATM MAC 344 for transmission of the ATM packet on the ATM network 140 (See FIGS. 1–2).

On the downstream path, downstream packets containing digital data destined for various subscribers is received by the ATM MAC 344 which handles transfers to and from the ATM network 140. The ATM MAC passes each received packet to the ATM PAD 340 where the ATM header is removed and the downstream device packet 306 is assembled. Using header content generated by the core processor 334 the PAD assembles data from the ATM network into channel specific packets each with their own header, data and control portions. The downstream packets are then passed to the Framer, tone orderer, and Reed Solomon encoder 336 where they are processed in a manner consistent with the control and header information contained therein.

Where redundancy in one of the time and frequency domain exists in the downstream channel the Walsh encoder injects the required redundancy by combining the code for the transmitted channel with the data from the frame encode block 336. The redundant data in the form of redundant tones within a DMT tone set or redundant sets of DMT tones are then passed to the input of the FTE. The FTE governs the multiplexing of these downstream packets which will be modulated by the FTE with the upstream packets which will be demodulated therein. Each downstream packet with the modulated data contained therein is then passed to the DSP PAD 316. In the DSP PAD the device packet header and control portions are removed, and a DSP bus header 304 is added. This header identifies the specific channel and may additionally identify the sending DSP, the target AFE, the packet length and such other information as may be needed to control the receipt and processing of the packet by the appropriate AFE. The packet is then passed to the DSP MAC for placement on the DSP bus 216 for transmission to the appropriate AFE.

FIG. 3 also shows a more detailed view of the processing of upstream and downstream packets within the AFE. In the embodiment of the invention shown, device packets are not utilized in the AFE. Instead, channel and protocol specific processing of each packet is implemented using control information for each channel stored in memory at session setup. Downstream packets from the DSP are pulled off the bus 216 by the corresponding AFE MAC on the basis of information contained in the header portion of that packet. The packet is passed to AFE PAD 346 which removes the header 304 and sends it to the core processor 372. The core processor matches the information in the header with channel control parameters 362 contained in memory 360. These control parameters may have been downloaded to the AFE at session setup. The raw data 302 portion of the downstream packet is passed to FIFO buffer 352 under the management of controller 350. Each channel has a memory mapped location in that buffer. The interpolator and filter 358 reads a fixed amount of data from each channel location in the FIFO buffer. The amount of data read varies for each channel depending on the bandwidth of the channel. The amount of data read during any given time interval is governed by the channel control parameters 362, discussed above. The interpolator upsamples the data and low pass filters it to reduce the noise introduced by the DSP. Implementing interpolation in the AFE as opposed to the DSP has the advantage of lowering the bandwidth requirements of the DSP bus 216. From the interpolator data is passed to the FIFO buffer 368 under the control of controller 366. The downstream packets 370 may increase in size as a result of the interpolation. The next module in the transmit pipeline is a DAC 378 which processes each channel in accordance with commands received from the core processor 372 using the control parameters downloaded to the control table 362 during channel setup. The analog output of the DAC is passed via analog mux 384 to a corresponding one of sample and hold devices 386. Each sample and hold is associated with a corresponding subscriber line. The sampled data is filtered in analog filters 390 and amplified by line amplifiers 394. The parameters for each of these devices, i.e. filter coefficients, amplifier gain etc. are controlled by the core processor using the above discussed control parameters 362. For example, where successive downstream packets carry downstream channels each of which implements different protocols, e.g. G.Lite, ADSL, and VDSL the sample rate of the analog mux 384, the filter parameters for the corresponding filter 390 and the gain of the corresponding analog amplifiers 394 will vary for each packet. This "on the fly" configurability allows a single downstream pipeline to be used for multiple concurrent protocols.

On the upstream path many of the same considerations apply. Individual subscriber lines couple to individual line amplifiers 396 through splitter and hybrids (not shown). Each channel is passed through analog filters (not Shown), sample and hold modules 388 and dedicated ADC modules 380–382. As discussed above in connection with the downstream/transmit path, each of these components is configured on the fly for each new packet depending on the protocol associated with it. Each upstream packet is placed in a memory mapped location of FIFO memory 374 under the control of controller 376. From the controller fixed amounts of data for each channel, varying depending on the bandwidth of the channel, are processed by the decimator and filter module 364. The amount of data processed for each channel is determined in accordance with the parameters 362 stored in memory 360. Those parameters may be written to that table during the setup phase for each channel.

From the decimator and filter the raw data 302 is passed to FIFO buffer 354 which is controlled by controller 356. Scheduled amounts of this data are moved to PAD 348 during each bus interval. The PAD wraps the raw data in a DSP header with channel ID and other information which allows the receiving DSP to properly process it. The upstream packet is placed on the bus by the AFE MAC 346. A number of protocols may be implemented on the bus 216. In an embodiment of the invention the DSP operates as a bus master governing the pace of upstream and downstream packet transfer and the AFE utilization of the bus.

Figure 4:
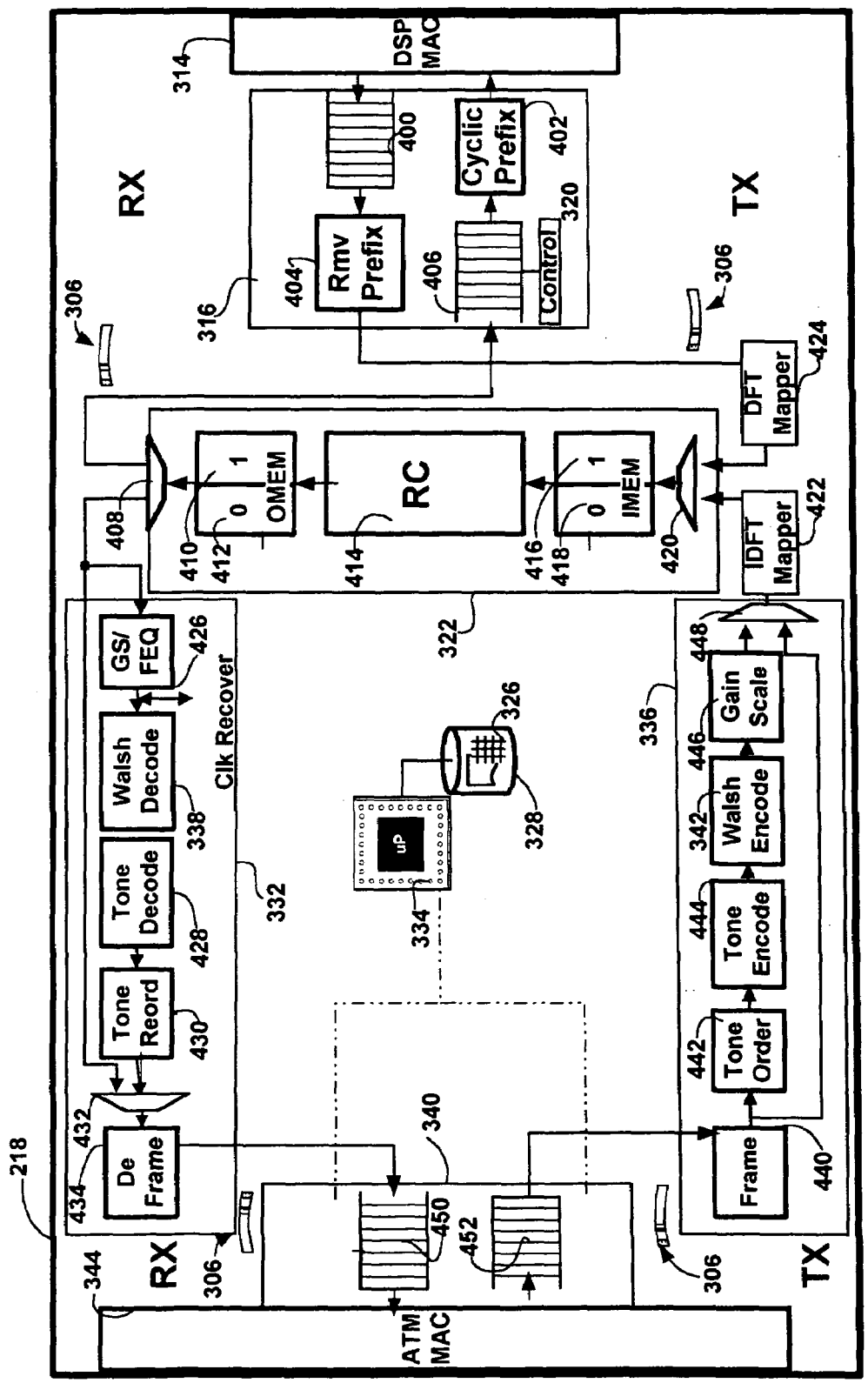
FIG. 4 is an expanded hardware view of the digital signal processor portion (DSP) portion of the line card shown in FIG. 3.

FIG. 4 is an expanded hardware view of the digital signal processor portion (DSP) of the line card shown in FIG. 3. Subcomponents of each of the DSP Pad 316, the FTE 322, the Deframer-decoder 332, the framer-encoder 336 and the ATM PAD 340 are shown.

On the upstream packet path, the DSP PAD includes a first-in-first-out (FIFO) buffer 400 where upstream packets from the AFEs are stored and a cyclic prefix remover 404. After removal of the cyclic prefix each packet is then passed to the DFT mapper 424. The DFT mapper is coupled to the input memory portion of the FTE via a multiplexer 420. The mapper handles writing of each sample set from a packet into the input memory in the appropriate order. The mapper may also handle such additional functions as time domain equalization (TEQ) filtering which is a digital process designed to normalize the impact of differences in channel response. The filter may be implemented as an FIR filter. The input memory comprises two portions 416 and 418. Multiplexer 420 provides access to these memories. While one sample set, e.g. time or frequency domain data, is being written from the upstream or downstream data paths into one of the memories the contents of the other of the memories are written into the row and column component 412 of the FTE 322. Once the DFT is completed by the row and column component the frequency domain coefficients generated thereby are stored in either of portions 410–412 of the output memory of the FTE. These coefficients correspond with each of the DMT sub carriers or tones. A demultiplexer 408 handles the coupling of the output memory to either the next component of the upstream path, i.e. the deframer-decoder 332 or of the downstream path. Next on the upstream path, the device packet with header and data portions and optional control portion is passed to the remaining components of the upstream path. These include the gain scalar and optional forward error correction (FEQ) 426, the Walsh decoder 338, the tone decoder 428, the tone re-orderer 430 and the deframer 434.

A multiplexer 432 couples the deframer input to either the tone reorderer 430 or to the output memory of the FTE. Each of these components is individually configurable on a per channel basis using tables stored locally in registers within each component, or within memory 328. The access to these tables/registers is synchronized by the logic in each of the components which responds to header or control information in each upstream packet to alter tone ordering/re-ordering, gain scaling constants per-tone per-channel, and FEQ constants per-tone per-channel. The processor 334 may initialize all the registers. From the deframer packets are passed to the FIFO buffer 450 which is part of ATM PAD 340.

The core processor 334 has DMA access to the FIFO buffer 450 from which it gathers statistical information on each channel including gain tables, or gain table change requests from the subscriber as well as instructions in the embedded operations portion of the channel. Those tables 326 are stored by the core processor in memory 328. When a change in gain table for a particular channel is called for the core processor sends instructions regarding the change in the header of the device packet for that channel via PAD 316. The core processor 334 then writes the new gain table to a memory, e.g. memory 326, which can be accessed by the appropriate component, e.g. FTE 322 or Gain Scalar 426. As the corresponding device packet is received by the relevant component that component, e.g. the gain scalar applies the updated parameters to appropriately scale the data portion of the packet and all subsequent packets for that channel. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

On the downstream path a FIFO buffer 452 within the ATM PAD 340 holds incoming packets. These are passed to the components in the Framer and Encoder module 336 for processing. The components of that module include the framer 440, tone orderer 442, tone encoder 444, Walsh encoder 342 and gain scalar 446. They are coupled via a multiplexer 448 to the IDFT mapper 422. As was the case with the deframer, the framer will use protocol specific information associated with each of these channels to look for different frame and super frame boundaries. The tone orderer supports varying number of tones, bytes per tone and gain per tone for each of the X-DSL protocols. For example the number of tones for G.Lite is 128, for ADSL is 256 and for VDSL 2048. The number of bits to be extracted per tone is read from the tone-ordering table or register at the initiation of processing of each packet. For example as successive packets from channels implementing G.Lite, ADSL and VDSL pass through the DMT Tx engine the number of tones will vary from 128 for G.lite, to 256 for ADSL, to 2048 for VDSL. In the encoder 444 constellation mapping is performed based on the bit pattern of each packet. The output is a two dimensional signal constellation in the complex domain.

Next in the IDFT mapper each device packet is correlated with a channel and protocol and mapped into input memory via a connection provided by multiplexer 420. The mapping is in a row and column order. Next in the FTE, the complex digital symbols DMT symbols are modulated into carriers or tones in the row and column transform component 414 and placed in either portion 410 or 412 of output memory having been transformed from the frequency to the time domain. The dimensions of the row and column transforms vary on a channel specific basis. Next a packet with the memory contents, i.e. the digitized DMT symbols transformed to the time domain is passed as a packet via demultiplexer 408 to the DSP FIFO buffer 406. This is part of DSP PAD 316. Individual packets are moved from this buffer to the cyclic prefix component 402 for the addition of the appropriate prefix/suffix. The cyclic prefix component is responsive to the device packet header which identifies the channel for which data is being processed. This can be correlated with the required prefix/suffix extensions for the protocol associated with the channel on the basis of parameters 326 stored in main memory 328 or within dedicated registers in the component. For example the cyclic extension for G.Lite is 16, for ADSL 32, and for VDSL 320.

This device architecture allows the DSP transmit and receive paths to be fabricated as independent modules or submodules which respond to packet header and or control information for processing of successive packets with different X-DSL protocols, e.g. a packet with ADSL sample data followed by a packet with VDSL sampled data A mixture of different control techniques are used to control the behavior of the individual components of the DSP. The packet header may simply identify the channel. The component receiving the packet may then reference internal registers or downloaded tables such as table 326 to correlate the channel with a protocol and the protocol with the corresponding parameters with which the data portion of the packet is to be processed. Alternately the device packet may contain specific control information such as that associated with shutting down a channel, idling a channel, or shutting down the DSP.

Figure 5:
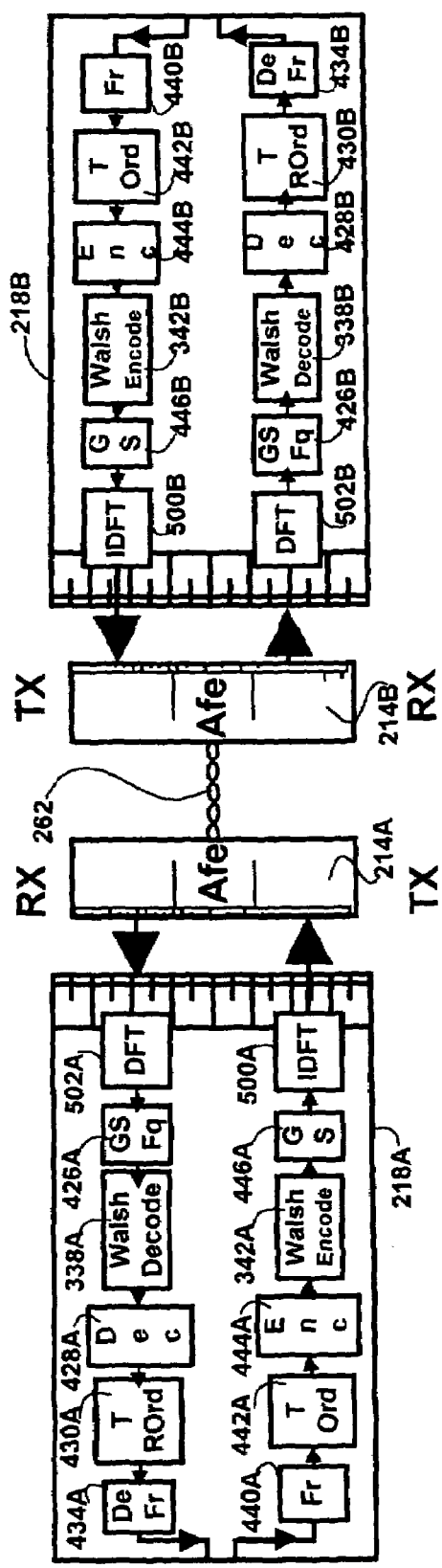
FIG. 5 shows two logical modems each of which supports redundancy in either the time or frequency domain for symmetric DMT line codes, and both of which are coupled to one another across a subscriber line.

FIG. 5 shows two logical modems each of which supports redundancy in either the time or frequency domain for symmetric DMT line codes, and both of which are coupled to one another across a subscriber line 262. The components and their functioning are identical to those discussed above with the exception that discrete IDFT and DFT modules 500A–B and 502A–B respectively are shown to simplify the following explanation of multiple access via frequency or time domain redundancy.

FIG. 6A is a graph of a prior art asymmetrical DMT line code showing both the upstream and downstream frequency ranges with representative tones. An upstream set of tones 600 defined in an upstream frequency range from the subscriber to the CO is defined between a lower frequency $f_1$ and an upper frequency $f_2$. An individual upstream tone 604 is shown. This is transmitted with its own sub-carrier and individual quadrature amplitude modulated ("QAM") symbol is shown. A downstream set of tones 602 defined in an downstream frequency range from the CO to the subscriber between a lower frequency $f_3$ and an upper $f_4$ is shown. Several individual downstream tones 606, 608, 612, 610 are shown. Each carries varying numbers of bits allocated by the tone orderer of the respective modem. These also are transmitted with individual sub-carrier and individual quadrature amplitude modulated ("QAM") symbol defined by the tone encoder. The upstream and downstream tones are asymmetrical. For G.Lite for example there are 32 upstream tones 96 downstream tones for a total of 128 tones. For ADSL there are 32 upstream tones and 224 downstream tones for a total of 256 tones. VDSL admits two additional frequency ranges for upstream and downstream communications.

FIGS. 6BC and 6C are graphs of the line code in which multiple access is accomplished via redundancy in the frequency domain and the time domain respectively, to enable symmetrical use of the frequency ranges shown in FIG. 6A. In FIG. 6B the combined RN tones of both the upstream and downstream frequency ranges 600 and 602 are used for both upstream and downstream communications. Each individual tone 604, 606–612 for example contains redundancy of order R within the frequency domain for a total of RN tones. The tones are shown as stacked, consisting of a single symbol which corresponds with both the upstream and downstream component of the 2 channels communicated on the shared communication medium. For the case of two channels sharing the communication medium each upstream and downstream tone is redundantly expressed in at least two tones. Which tones contain redundant data is information which the Walsh decoder shown in the previous FIG. 5 requires in order to remove redundancy from digital DMT symbols in the frequency domain which it receives from the DFT 502A–B. The redundancy is implemented with the appropriate sign convention to maintain orthogonality, between the two or more channels which share the combined tone sets 600 and 602.

FIG. 6C shows redundancy implemented in the time domain. Here each tone set includes a number of tones equal to I/R times the number of tones shown in FIG. 6B where R is the order of the redundancy. In the two channel examples shown in the following text the order of redundancy is 2 therefore there are ½ the tones shown in FIG. 6B. Implementation of multiple access via redundancy in the time domain therefore requires in this case ½ the number of tones within each combined tone set 600–602 and the transmission of two, in this case, tone sets at times $t_1$ and $t_2$. Here also the number of tones required for redundancy is RN. These two tone sets contain the same cumulative number of tones RN as was associated with frequency domain bases multiple access method shown in FIG. 6B.

Figure 7A:
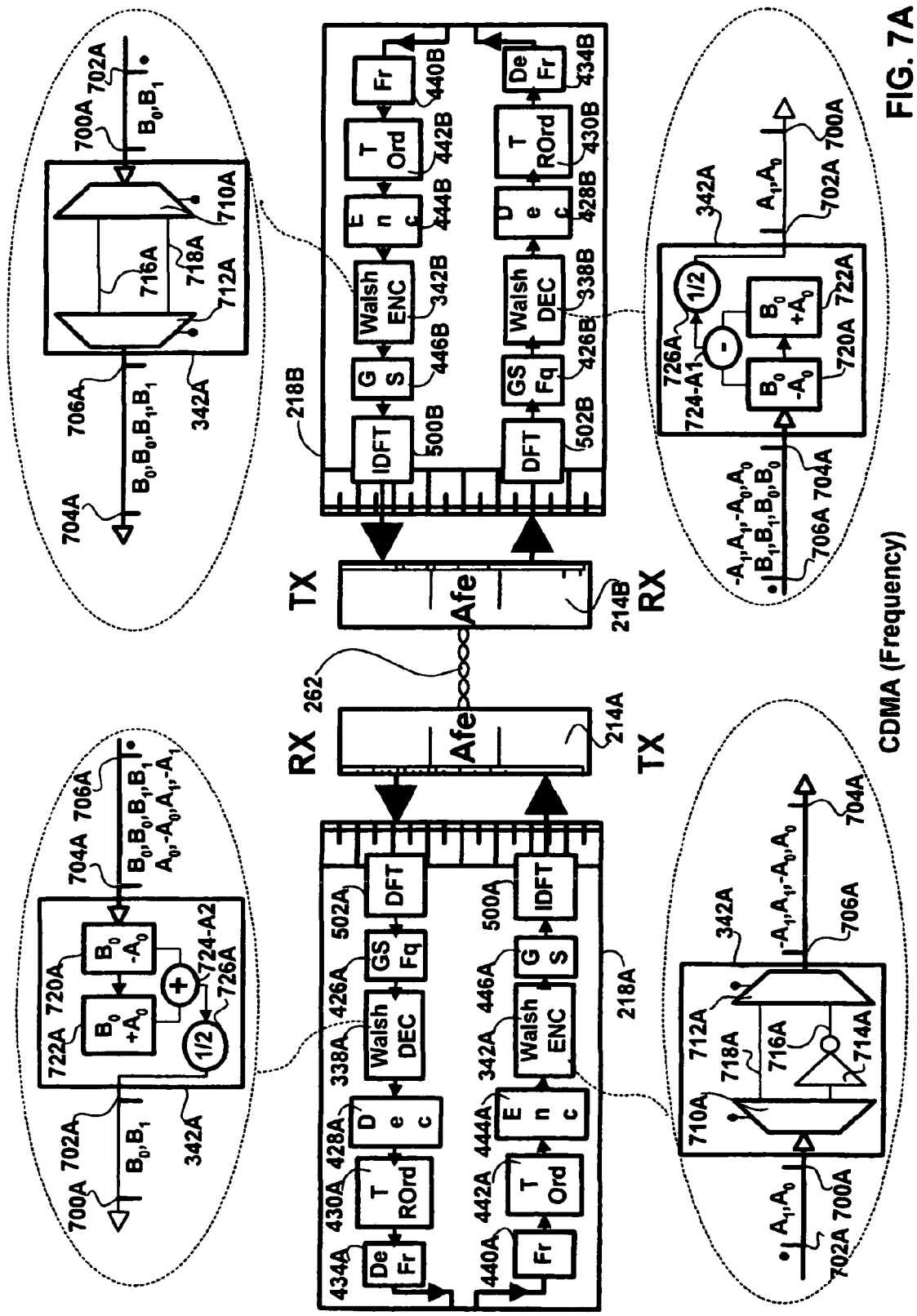
FIG. 7AB show an embodiment of the transmit and receive logic associated with redundancy for DMT line codes implemented in the frequency and time domains respectively.
Figure 7B:
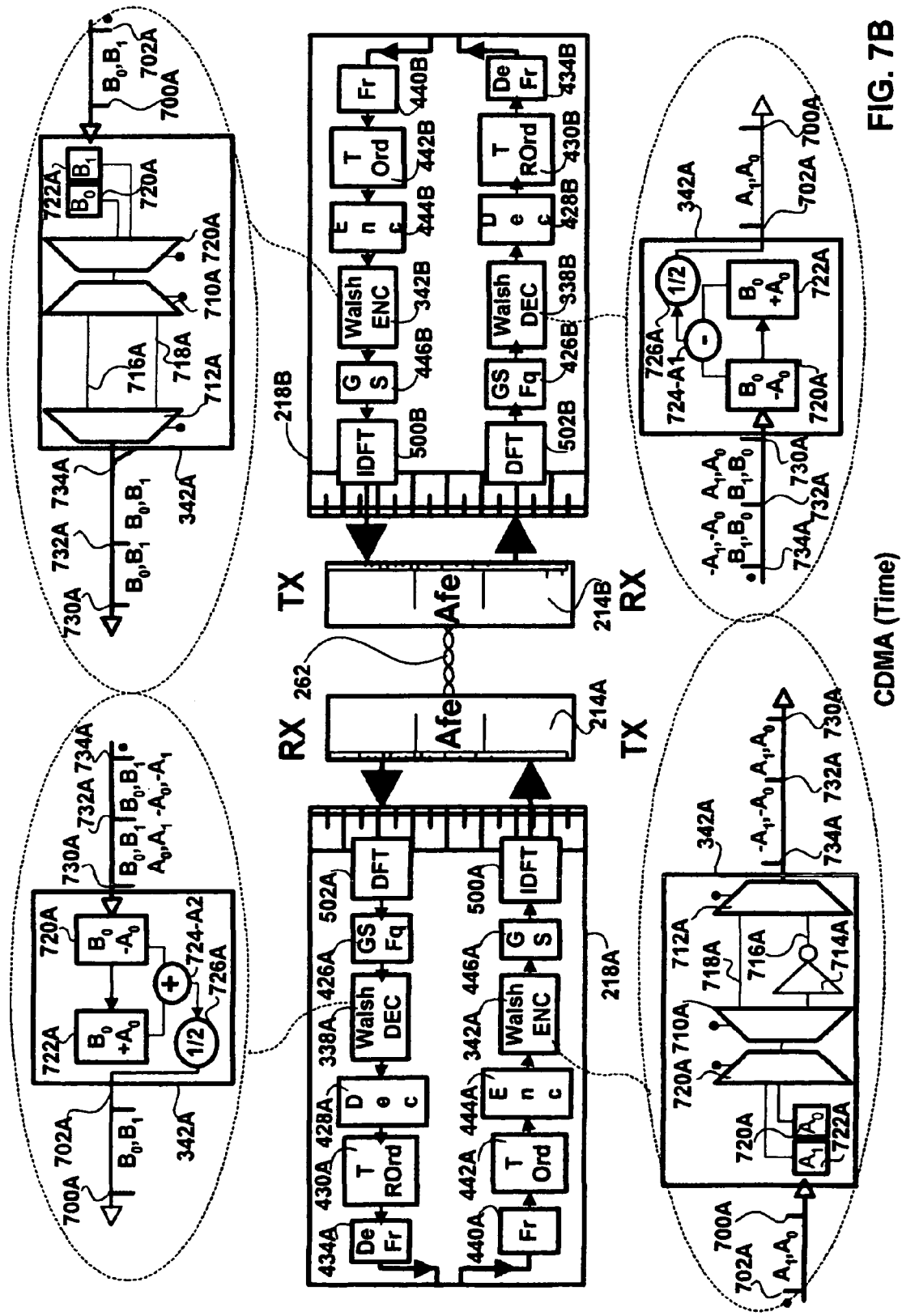

FIGS. 7 and 7B show an embodiment of the transmit and receive logic associated with redundancy for DMT line codes implemented in the frequency and time domains respectively.

Two logical modems are shown identical to the modems shown in FIG. 5. The first logical modem includes DSP 218A together with AFE 214A. The second logical modem includes DSP 218B together with AFE 218B. The modems are coupled to one another via a common communication medium, e.g. subscriber line 262. Exploded views of a hardware implementation of the multiple access decoders 338A–B and encoders 342A–B are shown within their corresponding modem. In the embodiment shown the encoders take an incoming set of DMT symbols for each tone. Each symbol may be expressed as a complex number x+ij.

In FIG. 7A multiple access via frequency domain redundancy is implemented using the DMT line code as discussed above in FIG. 6B. In this embodiment the incoming data stream is framed in framer 440A. Individual portions of the framed data are allocated to a corresponding tone bin by the tone orderer 442A and passed to the DMT tone encoder 444A where they are mapped to a DMT symbol and expressed as a complex number. In the example shown the number of DMT tones processed in each tone set by the tone ordered 442A is two shown within the frame boundaries 700A–702A. The two DMT tones are labeled $A_1$, $A_0$ with $A_0$ the first of the DMT symbols to be transmitted. Redundancy in the frequency domain is injected to this set of tones by appropriate switching of the Walsh encoder 342A in accordance with the selected Walsh code driving the demultiplexer 710A and multiplexer 712A which switch each incoming symbol of the symbol set from a non-inverted path 718A to an inverted path 716A which includes inverter 714A. This implements redundancy R of order 2 in the frequency domain for a total of RN tones, in this case 4 within a single tone set. The encoder generates a tone set with twice the number of tones per tone set as input as shown within frame boundaries 704A–706A. In the example shown these are: $-A_1$, $A_1$, $-A_0$, $A_0$, for a total of 4 DMT symbols. The sign convention corresponds with a Walsh code of +/- 1s assigned to DSP 218A for transmission of data. The Walsh code for the DSP 218B is orthogonal to that assigned to DSP 218A. The sequence of DMT tones transmitted by that modem is: $B_1$, $B_1$, $B_0$, $B_0$. The decoders 338A–B include corresponding buffers 722A–B and 720A–B, along with summers 724-A1, subtractor 724-A2 and corresponding dividers 726A–B. The decoder accepts 4 DMT symbols each of which includes contribution from both the transmit path of the opposite modem as well as from Self NEXT from the modems own transmitter with which the DMT tone set is shared. In the example shown the received tones are: $A_0+B_0$, $A_0+B_0$, $A_1+B_1$, $_-A_1+B_1$. The decoder decodes the incoming sets of tones redundant in the frequency domain. The redundancy and coding is established during session set up for each channel. The redundancy is removed and the appropriate received DMT symbol sets $B_0$, $B_1$ are passed to the tone decoder 428A for decoding. The tone reorderer 430A performs reordering of the tones and the deframer 434A deframes the DMT symbols. On the receive path of the opposite modem the decoder 338B decodes with an orthogonal Walsh code. In alternate embodiments of the invention redundancy in the frequency domain may be implemented at the tone orderer. In alternate embodiments of the invention code sequences other than Walsh coding may be implemented to introduce orthogonal redundancy into the channels which share a common set of DMT tones.

In FIG. 7B multiple access via time domain redundancy is implemented using the DMT line code as discussed above in FIG. 6C. In this embodiment the incoming data stream is framed in framer 440A. Individual portions of the framed data are allocated to a corresponding tone bin by the tone orderer 442A and passed to the DMT tone encoder 444A where they are mapped to a DMT symbol and expressed as a complex number. In the example shown the number of DMT tones processed in each tone set by the tone ordered 442A is two shown within the frame boundaries 700A–702A. The two DMT tones are labeled $A_1$, $A_0$ with $A_0$ the first of the DMT symbols to be transmitted. Redundancy in the time domain is injected to this set of tones by appropriate switching in accordance with the selected Walsh code of the Walsh encoder 342A. An additional multiplexer 720A and input buffers 720A–722A have been added to the encoder enabling it to implement redundancy R of order 2 in the time domain. The encoder 342A generates two tone sets with the same number of tones as the input tone set for a total of RN tones, in this case 4. In the example shown these are: $-A_1$, $A_0$ in a second tone set with boundaries 732A–734A and $A_1$, $A_0$, in a first tone set with boundaries 730A–732A. The sign convention corresponds with a Walsh code of +/− 1s assigned to DSP 218A for transmission of data. The Walsh code for the DSP 218B is orthogonal to that assigned to DSP 218A. The sequence of DMT tones transmitted by that modem is: $B_1$, $B_1$, $B_0$, $B_0$. The decoders 338A–B include corresponding buffers 722A–B and 720A–B, along with summers 724-A1, subtractor 724-A2 and corresponding dividers 726A–B. The decoder accepts 4 DMT symbols each of which includes contribution from both the transmit path of the opposite modem as well as from Self NEXT from the modems own transmitter with which the DMT tone set is shared. In the example shown the received tones are from first to last: $A_{0+}B_0$, $A_{0+}B_0$, $A_{1+}B_1$, $-A_{1+}B_1$. The decoder decodes the incoming sets of tones redundant in the time domain. The redundancy and coding is established during session set up for each channel. The redundancy is removed and the appropriate received DMT symbol sets $B_0$, $B_1$ are passed to the tone decoder 428A for decoding. The tone reorderer 430A performs reordering of the tones and the deframer 434A deframes the DMT symbols. On the receive path of the opposite modem the decoder 338B decodes with an orthogonal Walsh code. In alternate embodiments of the invention redundancy in the time domain may be implemented at the output of the IDFT instead of the input as discussed above. In alternate embodiments of the invention code sequences other than Walsh coding may be implemented to introduce orthogonal redundancy into the channels which share a common set of DMT tones.

Figure 8:
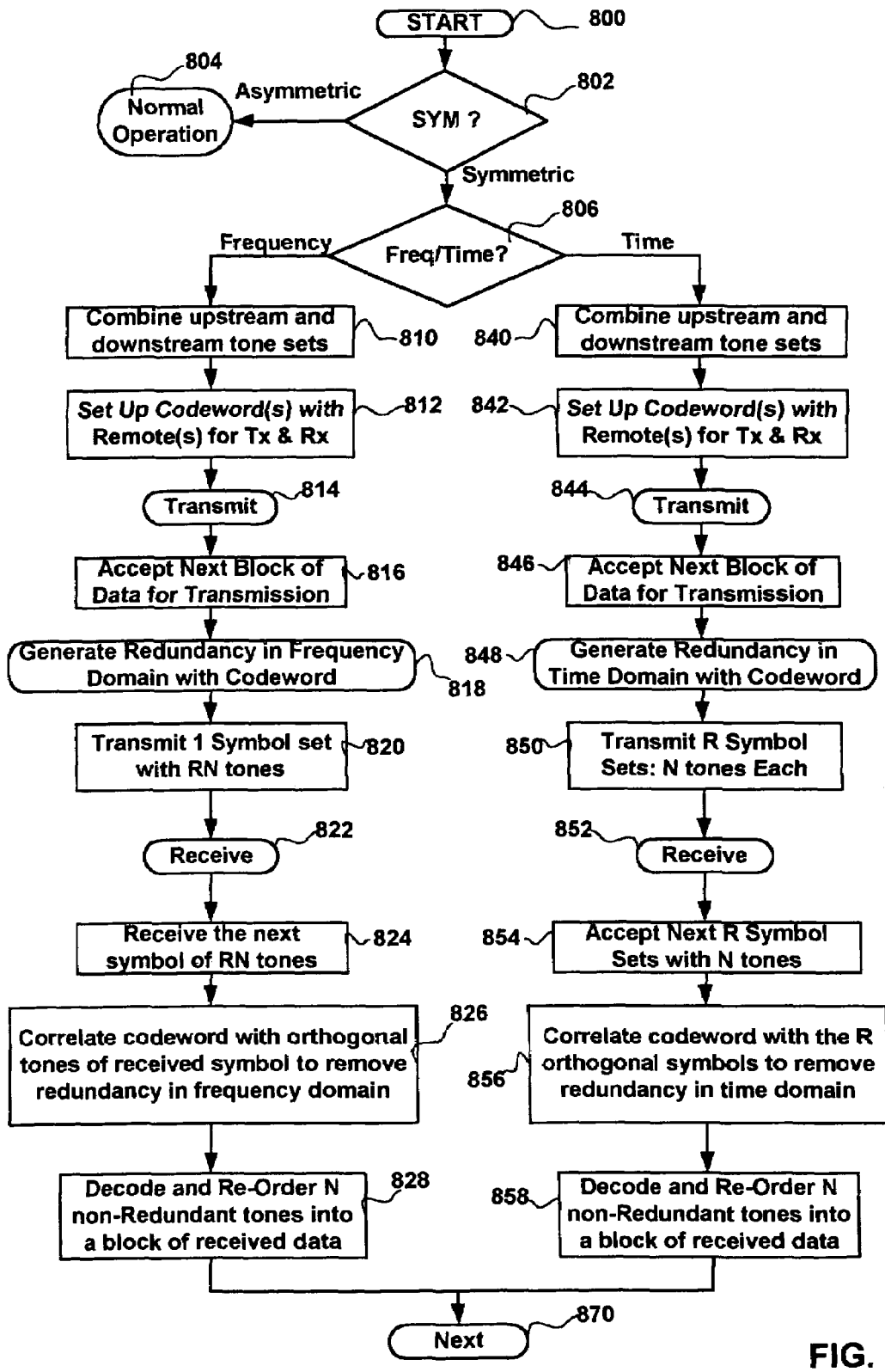
FIG. 8 is a process flow diagram showing the processes associated with implementing multiple access via redundancy for DMT line codes in either the time or frequency domains.

FIG. 8 is a process flow diagram showing the processes associated with implementing multiple access via redundancy for DMT line codes in either the time or frequency domains. Processing begins at start block 800 and control passes to decision process a 802. In decision process 802 a determination is made as to whether symmetrical multiple access of more than two channels within a single tone set is enabled. If not control passes to block 804 which marks the commencement of normal asymmetric functioning of all transmit and receive path portions of the modems discussed above. If multiple access is enabled for at least two channels to a single tone set then control passes to decision process 806. In process 806 a determination is made is to whether redundancy in the time or frequency domain will be implemented.

Frequency Domain:

For the case where redundancy in the frequency domain is implemented, control passes to process 810. In process 810 existing upstream and downstream tones sets are combined into a single set of tones and various components of the transmit and receive path shown in FIGS. 3–5 are configured accordingly. Control passes to process 812 in which the appropriate code words are assigned to the multiple access encoders and decoders of each modem. Control then passes to process 814 for the commencement of data transmission.

Data transmission begins with process 816 with the acceptance of the next block of data for transmission. Control then passes to process 818 in which redundancy in the frequency domain is injected into the tones associated with the block of data to be transmitted as shown in FIG. 6B. Next in process 820 one symbol set RN tones is transmitted. Control then passes to receive block 822.

Reception begins with process 822 from which control is passed to process 824 for reception of the next DMT symbol set of RN tones. R is the order of redundancy in the frequency domain. Control next passes to process 826 in which the multiple access decoder correlates the code word for the received channel with the digitized DM T symbol set received from the AFE and converted to the frequency domain by the DFT to remove redundancy in the frequency domain. Control then passes to process 828 in which tone decoding, reordering and de-framing are implemented. Then in process 870 the next set of tones for transmission or reception is processed.

Time Domain:

Multiple access via redundancy of the DMT line code in the time domain commences after a determination to that effect in decision process 806. Control passes to process 840. In process 840 existing upstream and downstream tones sets are combined into a single set of tones and various components of the transmit and receive path shown in FIGS. 3–5 are configured accordingly. Control passes to process 842 in which the appropriate code words are assigned to the multiple access encoders and decoders of each modem. Control then passes to process 844 for the commencement of data transmission.

Data transmission begins with process 846 with the acceptance of the next block of data for transmission. Control then passes to process 848 in which redundancy in the time domain is injected into the tones associated with the block of data to be transmitted as shown in FIG. 6C. Next in process 850 R symbol sets with a total of RN tones are transmitted. Control then passes to receive block 852.

Reception begins with process 852 from which control is passed to process 854 for reception of the next DMT symbol sets of RN tones. R is the order of redundancy in the time domain. Control next passes to process 856 in which the multiple access decoder correlates the code word for the received channel with the digitized DMT symbol sets received from the AFE and converted to the frequency domain by the DFT to remove redundancy in the time domain. Control then passes to process 858 in which tone decoding, reordering and de-framing are implemented. Then in process 870 the next set of tones for transmission or reception is processed.

In alternate embodiments of the invention the communications between various components on the transmit path and the receive path of each logical or physical modem are implemented with packet based transfers of data and symbols the invention may be applied with equal utility to a physical or logical modem with any other form of modular or non-modular communication including point-to-point communication.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone X-DSL communication device with a plurality of shared and discrete components forming a transmit path and a receive path configured to couple to a communication medium to communicate multi-tone modulated communication channels, and the multi-tone X-DSL communication device comprising:

a Walsh encoder on the transmit path and the Walsh encoder configured to encode with a first Walsh codeword successive symbols of a transmitted communication channel signal;

an inverse Fourier transform component on the transmit path coupled to the Walsh encoder to transform encoded symbols of the transmitted communication channel signal from the frequency domain to the time domain for transmission over the communication medium to an opposing communication device on a common set of tones;

a Fourier transform component on the receive path, and the Fourier transform component configured to receive from the opposing communication device on the common set of tones a communication channel signal encoded by the opposing communication device with a second Walsh codeword orthogonal to the first Walsh codeword and to transform the received communication channel signal from the time domain to the frequency domain; and a Walsh decoder on the receive path, and the Walsh decoder coupled to the Fourier transform component and configured to decode a with the second Walsh codeword the received communication channel signal transformed by the Fourier transform component, whereby the common set of tones of the transmitted and received communication channel signals span a shared frequency range on the communication medium.

2. The multi-tone X-DSL communication device of claim 1, further comprising:

the Walsh encoder further configured to encode successive pairs of symbols with the first Walsh codeword thereby generating data redundancy on the transmit path in the time domain between each successive pair of encoded symbols of the transmitted communication channel signal; and the Walsh decoder further configured to decode successive pairs of encoded symbols of the received communication channel signal with the second Walsh codeword a thereby removing data redundancy in the time domain from the received communication channel signal.

3. The multi-tone X-DSL communication device of claim 1, further comprising:

the Walsh encoder further configured to encode each symbol with the first Walsh codeword thereby generating data redundancy on the transmit path in the frequency domain, between tones within each encoded symbol; and the Walsh decoder further configured to decode each encoded symbol of the received communication channel signal thereby removing a data redundancy in the frequency domain from the received communication channel signal.

4. A method for communicating multi-tone modulated upstream and downstream communication channels between a first and second multi-tone X-DSL communication devices coupled to one another via a communication medium, and the method for communicating comprising the steps of:

establishing a first Walsh codeword and a second Walsh codeword orthogonal to one another for encoding upstream and downstream communication channels signals between the first and second multi-tone X-DSL communication devices;

encoding transmissions of the upstream communication channel signal with the first Walsh codeword and encoding transmissions of the downstream communication channel signal with the second Walsh codeword established in the establishing step;

transforming the upstream and downstream communication channel signals between a frequency domain and a time domain using a common set of tones spanning a shared frequency range on the communication medium; and decoding reception of the upstream communication channel signal with the first Walsh codeword and decoding reception of the downstream communication channel signal with the second Walsh codeword.

5. The method of claim 4, wherein the encoding and decoding steps further comprises:

encoding successive pairs of symbols transmitted on the upstream and downstream communication channels signals, thereby generating data redundancy in the time domain between each successive pair of encoded symbols; and decoding successive pairs of encoded symbols received on the upstream and downstream communication channel signals, thereby removing the data redundancy in the time domain.

6. The method of claim 4, wherein the encoding and decoding steps further comprises:

encoding duplicating tones within each tone set each symbol transmitted of on the upstream and downstream communication channels signals on the transmit paths of the first modem and second modem respectively thereby generating data redundancy in the frequency domain between tones in each encoded symbols; and decoding each encoded symbol received on the upstream and downstream communication channel signals, thereby removing the data redundancy in the frequency domain.

* * * * *